US008874093B2

(12) United States Patent
Zotov et al.

(10) Patent No.: US 8,874,093 B2
(45) Date of Patent: Oct. 28, 2014

(54) SCENARIOS CREATION SYSTEM FOR A MOBILE DEVICE

(75) Inventors: Igor Yurievich Zotov, St. Petersburg (RU); Anatolyevich Andrey Danilov, St. Petersburg (RU); Kirill Mikhailovich Pribylov, St. Petersburg (RU); Alexandr Nikolayevich Smirnov, St. Petersburg (RU)

(73) Assignee: Motorola Mobility LLC, Libertyville, IL (US)

( * ) Notice: Subject to any disclaimer, the term of this patent is extended or adjusted under 35 U.S.C. 154(b) by 520 days.

(21) Appl. No.: 12/747,952

(22) PCT Filed: Dec. 13, 2007

(86) PCT No.: PCT/RU2007/000705
§ 371 (c)(1),
(2), (4) Date: Dec. 14, 2010

(87) PCT Pub. No.: WO2009/075602
PCT Pub. Date: Jun. 18, 2009

(65) Prior Publication Data
US 2011/0092255 A1   Apr. 21, 2011

(51) Int. Cl.
*H04M 3/00* (2006.01)
*H04M 1/00* (2006.01)
*G06F 9/44* (2006.01)
*H04M 1/725* (2006.01)

(52) U.S. Cl.
CPC ...... *H04M 1/72522* (2013.01); *H04M 1/72563* (2013.01); *G06F 8/34* (2013.01)
USPC .......................................... 455/418; 455/566

(58) Field of Classification Search
USPC .................................................. 455/566, 418
See application file for complete search history.

(56) References Cited

U.S. PATENT DOCUMENTS

| 5,898,434 | A | * | 4/1999 | Small et al. ................... 715/810 |
| 6,546,263 | B1 | * | 4/2003 | Petty et al. ..................... 455/566 |
| 2002/0151295 | A1 | | 10/2002 | Boss et al. |
| 2003/0064757 | A1 | * | 4/2003 | Yamadera et al. ............ 455/566 |
| 2005/0020316 | A1 | * | 1/2005 | Mahini .......................... 455/566 |
| 2005/0188331 | A1 | | 8/2005 | Shimada et al. |
| 2006/0073816 | A1 | * | 4/2006 | Kim et al. ................... 455/414.1 |
| 2006/0148528 | A1 | * | 7/2006 | Jung et al. ..................... 455/566 |
| 2006/0223553 | A1 | * | 10/2006 | Reisgies ....................... 455/466 |
| 2006/0224433 | A1 | * | 10/2006 | Baek et al. ........................ 705/9 |
| 2007/0060205 | A1 | * | 3/2007 | Kim ............................... 455/566 |
| 2007/0213099 | A1 | * | 9/2007 | Bast ............................... 455/566 |

(Continued)

FOREIGN PATENT DOCUMENTS

DE   10008632 B4   2/2004
WO   2004072849 A1   8/2004

*Primary Examiner* — Christopher M Brandt
(74) *Attorney, Agent, or Firm* — Shumaker & Sieffert, P.A.

(57) ABSTRACT

A mobile device comprising a display for displaying a plurality of icons, wherein the icons include at least one event icon that defines a specific event and at least one function icon that defines a function of the mobile device; means for manipulating the icons to allow a sequence of icons to be generated to form a block diagram that includes at least one event icon and at least one function icon, wherein the at least one event icon defines the event that causes the function associated with the at least one function icon to be performed; and means for converting the sequence of icons into a form that is executable by the mobile device.

15 Claims, 7 Drawing Sheets

(56) References Cited

U.S. PATENT DOCUMENTS

2007/0226658 A1* 9/2007 Virk .............................. 715/864
2008/0113683 A1* 5/2008 Paas et al. .................. 455/552.1
2009/0005071 A1* 1/2009 Forstall et al. ............. 455/456.1

* cited by examiner

SCENARIOS CREATION SYSTEM FOR A MOBILE DEVICE

The present invention relates to a mobile device and in particular a mobile device that allows an end user to enhance the mobile device's capabilities.

With the continuing increase in processor power of microprocessors, mobile devices, for example small mobile or wireless communication devices, have continued to become more complex and sophisticated.

However, despite this continuing increase in processor power the mobile device user continues to have limited capability in adjusting a mobile device beyond the confines of the functionality provided by the mobile device manufacture.

Typically, to allow an end user to modify a mobile device to provide functionality beyond that provided by the mobile device manufacture requires the end user to program a mobile device, which normally requires specialized hardware or software, or access to proprietary information, such as authentication keys and/or codes.

As such, upon an event occurring at a mobile device (e.g. the receipt of an incoming call or SMS message) an end user of the mobile device only has the option to accept the specific functionality that the mobile device provides, for example the ringing or vibrating of a radio telephone upon receipt of an incoming telephone call or SMS message. However, it is recognised that in addition to a user of a mobile device often wishing to personalise the appearance of a mobile device they also wish to personalise the functionality of a mobile device.

Accordingly, it is desirable to improve this situation.

In accordance with an aspect of the present invention there is provided a mobile device according to the accompanying claims.

This provides the advantage of allowing an end user of a mobile device to programme a mobile device to perform a specific sequence of functions in response to a specific event using icons, where the icons provide an intuitively and clear graphic interface that allows the end user to perform the programming without the need for any special programming knowledge.

An embodiment of the invention will now be described, by way of example, with reference to the drawings, of which:

FIG. 1 illustrates an embodiment of the invention in which the mobile device is a radiotelephone 10, however any form of electronic mobile device could be used, for example a PDA.

Figure 1:
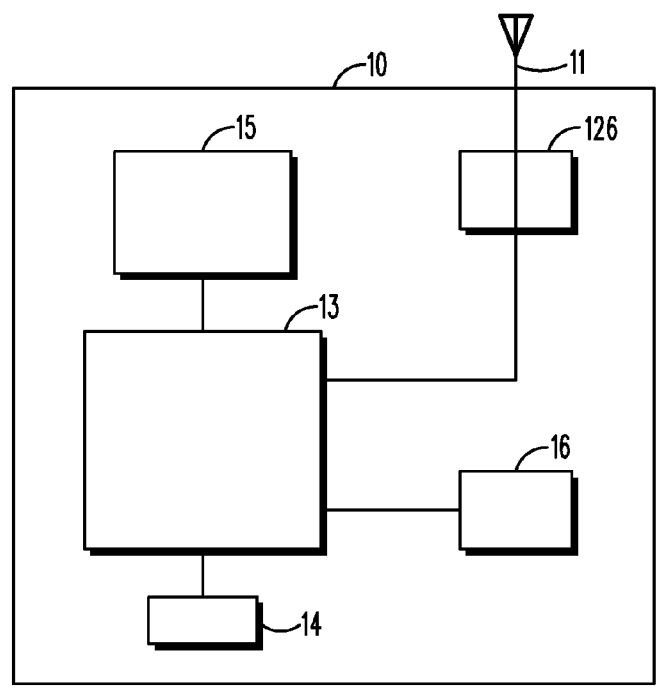
FIG. 1 illustrates a mobile device according to an embodiment of the present invention.

The radiotelephone 10 includes an antenna 11 that is coupled to a transmitter 12a and receiver 12a, with the transmitter 12a and receiver 12b also being coupled to a processor 13. The processor 13 is additionally coupled to a memory device 14, a display 15 and a user interface 16, where the user interface 16, for example a keypad, allows a user to interact with the radiotelephone 10. As would be well know to a person skilled in the art, the radiotelephone 10 includes additional features, for example a speaker and microphone (not shown), however for the purposes of this embodiment these features will not be described in any further detail.

For the purposes of the current embodiment the processor 13 is configured to operate a scenarios controlling system 10, where the scenarios controlling system 20 allows a user of the radiotelephone 10 to create a sequence of functions that are to be performed by the radiotelephone 10 upon the occurrence of an event, otherwise known as a scenario, as described in detail below.

Figure 2:
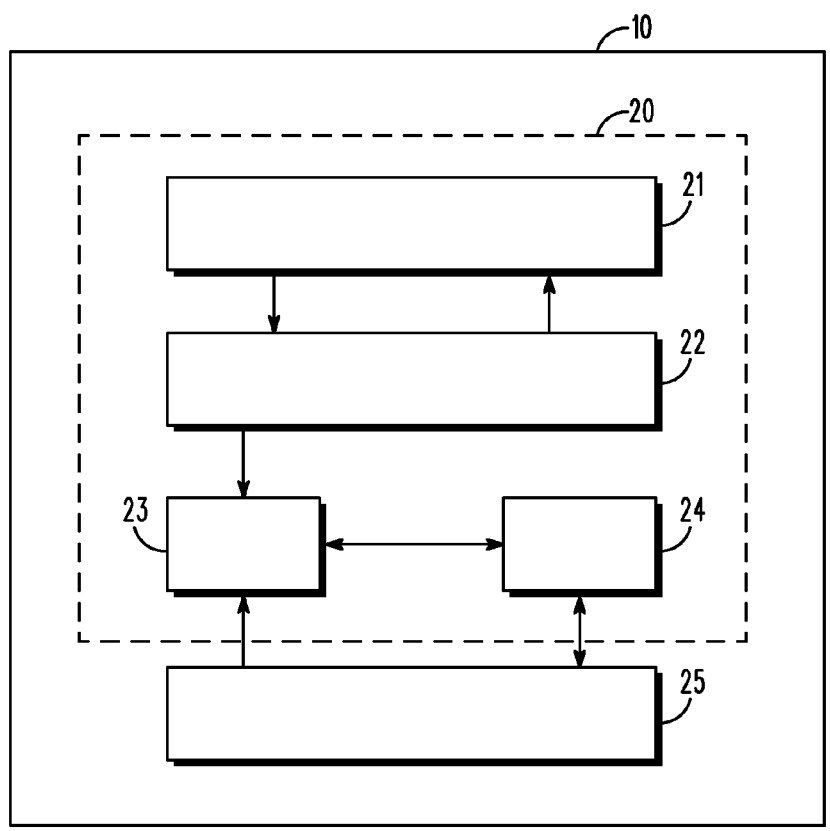
FIG. 2 illustrates a scenarios controlling system according to an embodiment of the present invention.

The functional blocks of the scenarios controlling system 20 are illustrated in FIG. 2, which corresponds in the current embodiment to four functions executed by the processor 13, which for the purposes of the present embodiment includes a scenario creation and updating graphical user interface module 21, a scenarios storage and exchange module 22, a scenarios manager module 23 and a scenarios interpreter module 24, as described in detail below. However, as would be appreciated by a person skilled in the art, the functional configuration of the scenarios controlling system can be varied in any number of ways.

As stated below, the scenarios controlling system 20 includes the following functional blocks: a scenarios creation and updating graphical user interface module 21, a scenarios storage and exchange module 22, a scenarios manager module 23 and a scenarios interpreter module 24.

The scenarios creation and updating graphical user interface module 21 is arranged to generate graphical representations of events and functions of the radiotelephone 10 in the form of icons that are movable on the display 15 to form a desired sequence of functions that is initiated by an event that triggers the sequence of functions.

As stated above, an icon provides a high level graphical representation of an event (e.g. the receiving of a telephone call could be represented by an icon of a telephone). As such, any form of graphical representation could be used as an icon, for example a word or a picture.

The list of available functions and events are stored in memory 14, to which is associated a specific icon. Examples of possible events are:

Incoming calls
Receiving a message
Timers/alarms
NET events
Connection events

It is also possible that a series of events could be used to form the trigger for performing the selected function(s).

Examples of possible functions are:

Start an outgoing call
Create a message
Send a message
Create a timer/alarm
Create a photo/video/audio
Establish a connection However, as would be appreciated by a person skilled in the art, the functions listed above are not limiting and the functions available to the scenarios controlling system 20 would typically reflect the same functions as those available to the radiotelephone 10. Similarly, any suitable event could be used to trigger the selected sequence of functions.

Additionally, icons are available to define the sequencing between different functions, that is to say the inter-relationship between the different functions/events.

Miscellaneous icons may also be included to facilitate the configuring of sequences, for example icons could be allocated for:

Conditions
Input date
Output date
Cycles generator
Save an object
Restore an object Miscellaneous icons can be used to represent features to create complex or nested functions or scenarios, where the cycle generator icon is a construction that allows repetition of some action a predefined number of times.

The scenarios creation and updating graphical user interface module 21 is arranged to display the available icons on the display 15 and operates in conjunction with the user interface 16 to allow a user to select an appropriate icon and to position the icon on the display 15 to form a sequence (i.e. the sequence that one function follows another function). As such, the sequence of icons form a block diagram that provides a pictorial model of a process. By the user being able to define a process by creating a block diagram with the mobile device being used to determine the detailed process steps, a mobile device user is able to define a scenario by merely understanding the overall concepts without requiring to understand detailed implementation information. Consequently, by a user being able to define a scenario using high level icon information, where the coding associated with functions or events defined by the icons being hidden from a user, the user is able to create a scenario without requiring detailed coding knowledge. As with other forms of block diagrams, the icons will typically be selected to aid interpretation and clarify meaning to a process.

Once a user has completed a required sequence the scenarios creation and updating graphical user interface module 21 can be used to forward the created sequence to the scenarios storage and exchange module 22 for saving in memory 14. Additionally, the scenarios creation and updating graphical user interface module 21 can be used to recover, via the scenarios storage and exchange module 22, an existing sequence and modify the existing sequence. The created scenario can be stored in memory 14 in any suitable form, for example the individual icons and configuration parameter, or an electronic representation of these, can be stored.

The scenarios creation and updating graphical user interface module 21 is also used by an end user, via the user interface 16, to define configuration parameters associated with each icon, which are saved with the sequence. For example, if a 'receiving a telephone call' icon is selected a possible configuration parameter may include a specific telephone number. Alternatively, if a 'take a photograph' icon is selected possible configuration parameters may relate to the camera settings.

As stated above the scenarios storage and exchange module 22 is arranged to save and retrieve created sequences to/from memory 14. Additionally, the scenarios storage and exchange module 22 is arranged to exchange an existing sequence with another device (not shown), or alternatively the scenarios storage and exchange module 22 can be arrange to receive a sequence from another device (not shown). The sequence can be exchanged by any suitable means, for example via an SMS message, via a wireless link such as a Bluetooth connection or a wired link.

The scenarios manager module 23 monitors the underlying levels 25 of the radiotelephone 10, for example via interrupts, and receives information regarding occurring events within the radiotelephone 10. If the scenarios manager module 23 determines that an event occurs that is associated with a stored and active sequence the scenarios manager module 23 instructs the scenarios interpreter module 24 to retrieve the scenario from memory 14 and execute the required functions. The scenarios manager module 23 can be configured to support a plurality of scenarios being executed at the same time. The scenarios interpreter module 24 is arranged to retrieve the scenario and to generate appropriate code that will execute the scenario on the radiotelephone 10. As such, the scenarios interpreter module 24 generates any code required to be executed on the radiotelephone 10 (i.e. the user need not be aware of code required to execute the scenario). Although for the purposes of the current embodiment the scenarios interpreter module 24 generates the code, other means of generating the code could be used. For example the scenarios creation and updating graphical user interface module 21 could be used to generate the code, alternatively individual code blocks that correspond to the icons can be preinstalled on the radiotelephone 10 and linked by any of the scenarios controlling system modules once a scenario has been created.

A number of different scenarios can be stored in memory to form a library of scenarios. The scenarios controlling system 20 can be configured to create a new scenario based on scenarios within the library. For example, a sequence of scenarios could be linked together to form a new scenario. Alternatively, different scenarios could be made active at different times, for example until 12 AM a first scenario should be made active while a second scenario is deactivated and after 12 AM the first scenario is deactivated while the second scenario is made activated.

FIGS. 3a to 3f illustrate an example of the scenarios controlling system 20 being used to create a scenario (i.e. a sequence of functions that are operable upon the occurrence of an event), where each of the FIGS. 3a to 3f illustrate an example of the display 15 of the radiotelephone 10 at different stages of the scenario generation. For the purposes of the present example, the scenario being generated, as shown in FIGS. 3a to 3f, is the taking and mailing of a photo by the radiotelephone 10 upon the occurrence of the radiotelephone 10 receiving a telephone call from a specific telephone number.

Figure 3A:
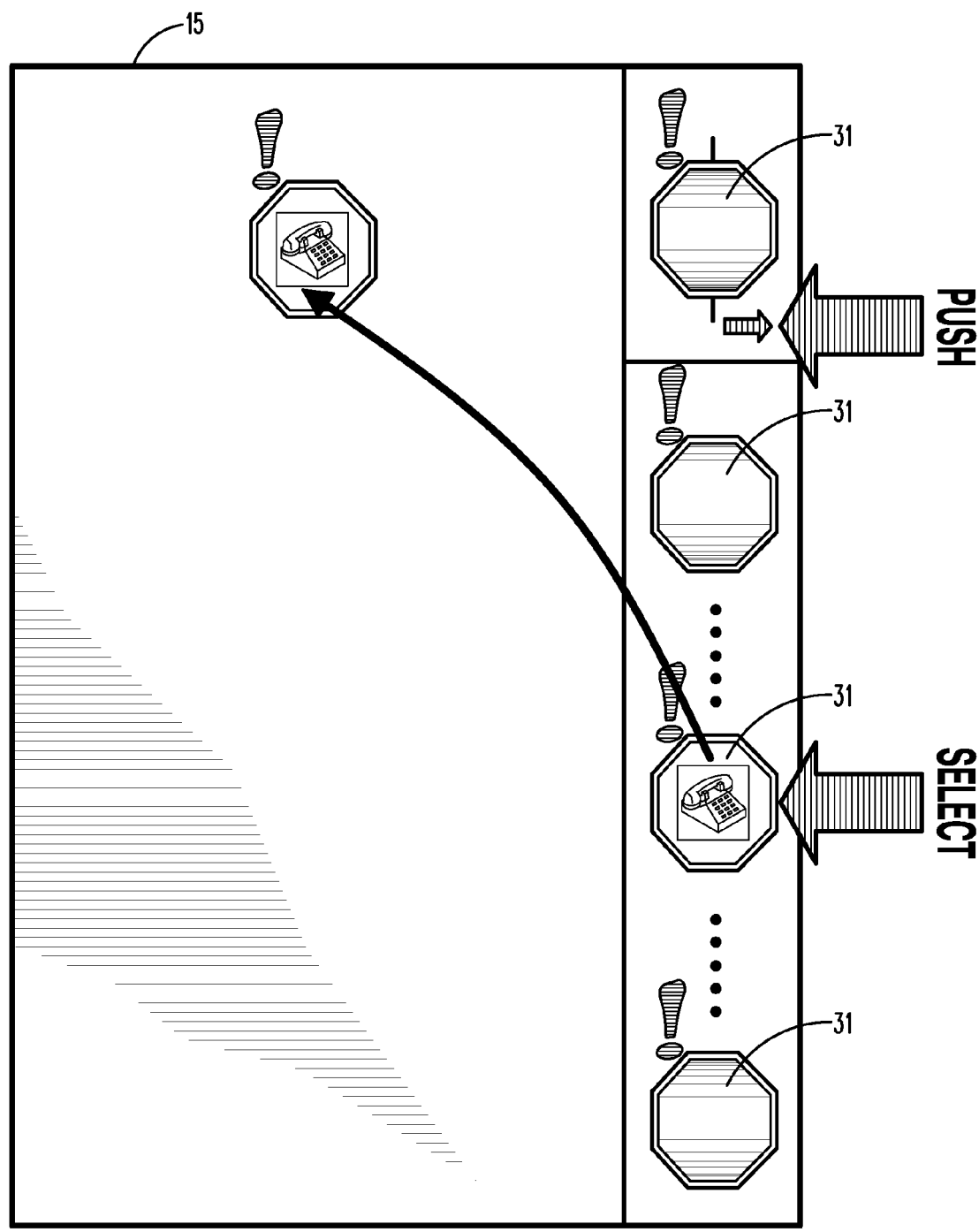
FIG. 3 illustrates graphical representations of a graphical user interface according to an embodiment of the present invention.
Figure 3B:
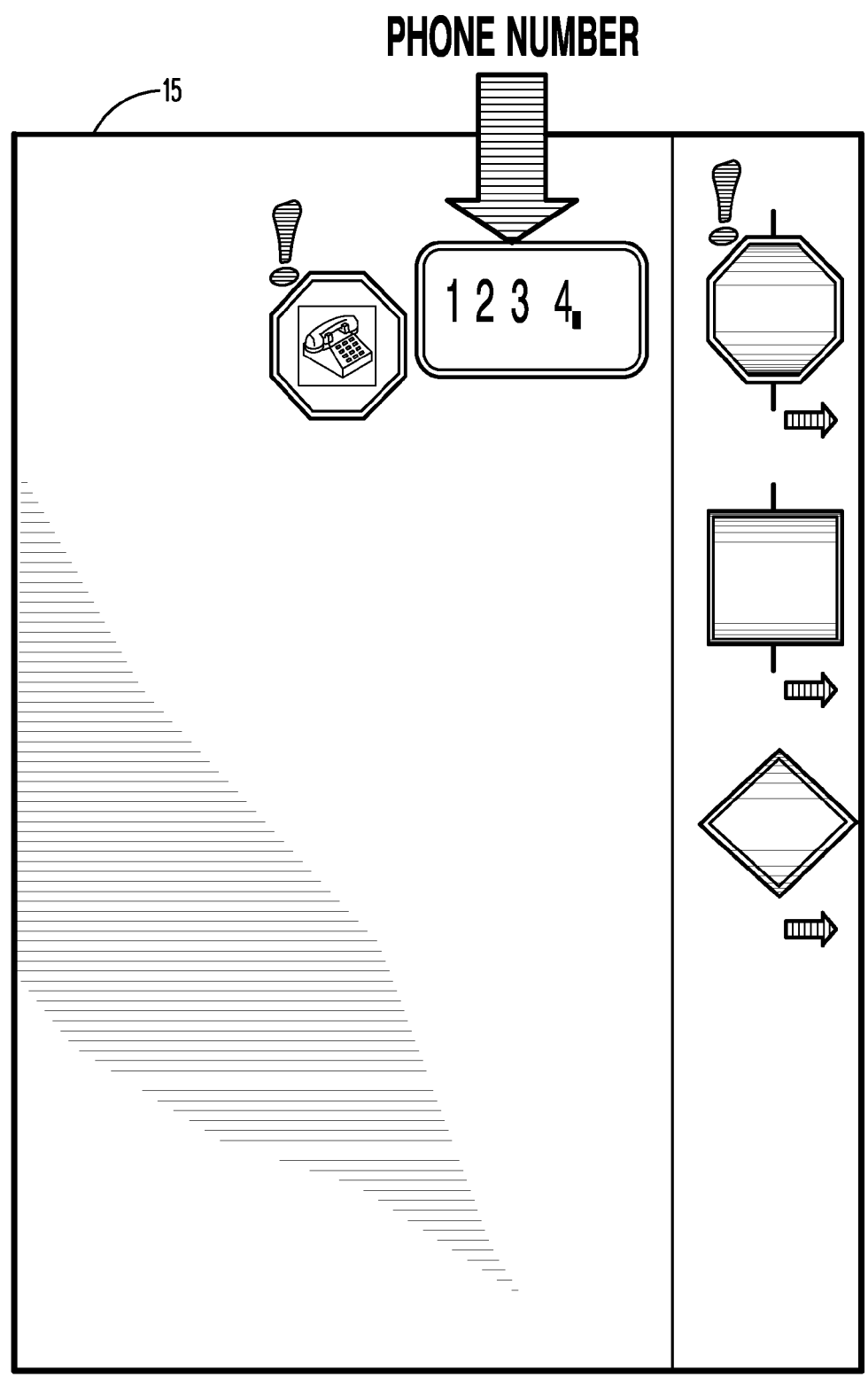
Figure 3C:
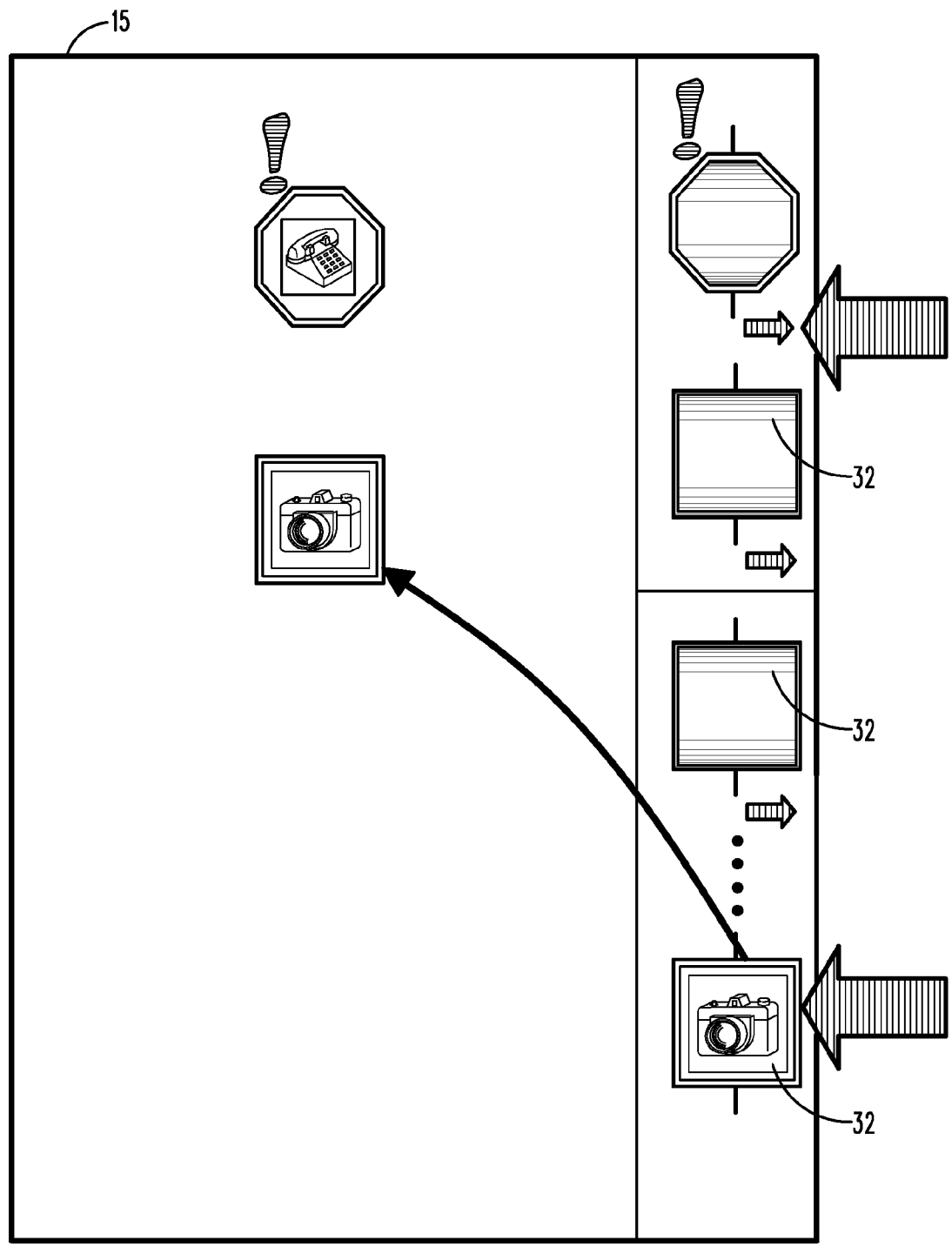

FIG. 3a illustrates the display 15 of the radiotelephone 10 in which a list of event icons 31 are displayed in the right hand column of the display 15. Via the user interface 16 a user selects the icon for an event corresponding to the receipt of a telephone call. Having selected the 'receipt of a telephone call event' icon as the initiating event for a sequence of functions, the user needs to set the configuration parameters associated with this icon to specify the specific telephone number, which is illustrated in FIG. 3b. As shown in FIG. 3b, an input field is selected and used by the user to input the telephone number that is required to initiate the execution of the selected functions. Having input the required configuration parameters associated with this event the user uses the user interface 16 to replace the event icons with a plurality of function icons 32 in the right hand column of the display 15. For the purposes of the present example, and as shown in FIG. 3c, the user selects the 'taking a picture' icon.

Figure 3D:
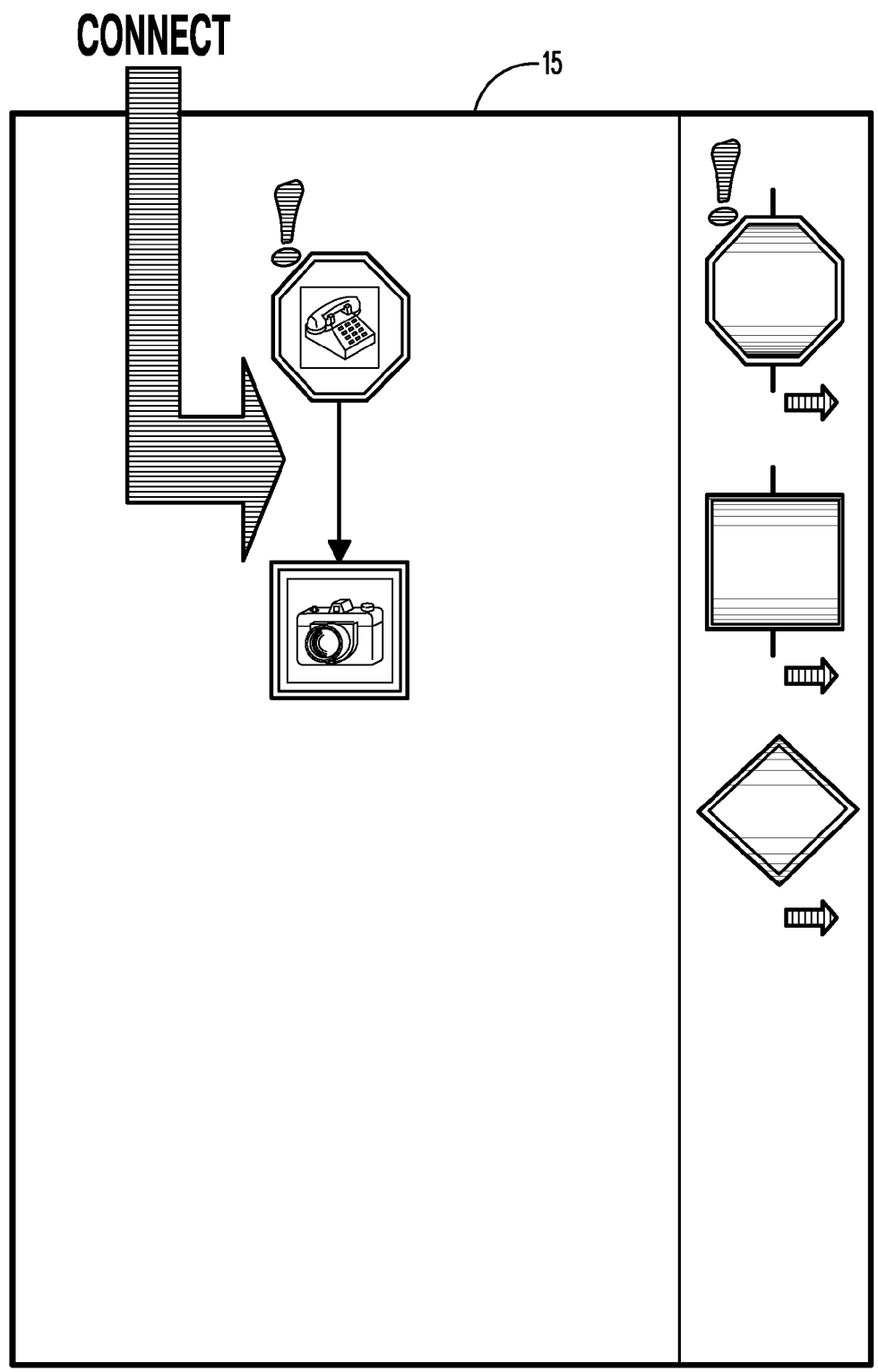

As shown in FIG. 3d the user then selects an interconnect icon to link the 'receipt of a telephone call event' icon with the 'taking a photograph' icon, where the interconnect is selected so that the taking of a photograph by the radiotelephone 10 is performed in response to a telephone call from the selected telephone. The interconnect can be configured to define the interconnect relationship, for example determine a time period between the event and the taking of the photograph or specify an intermediate condition such as the pushing of a button.

Figure 3E:
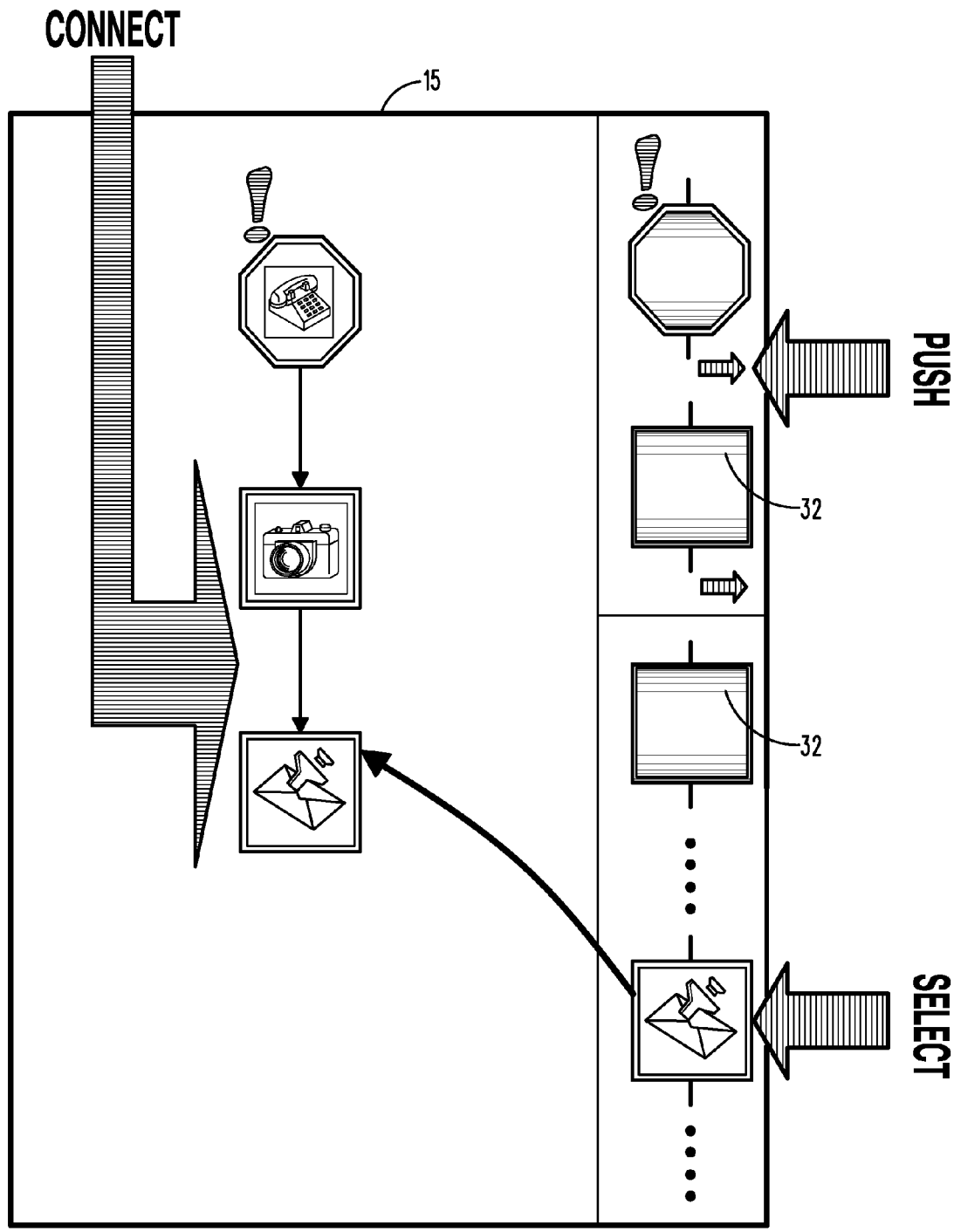
Figure 3F:
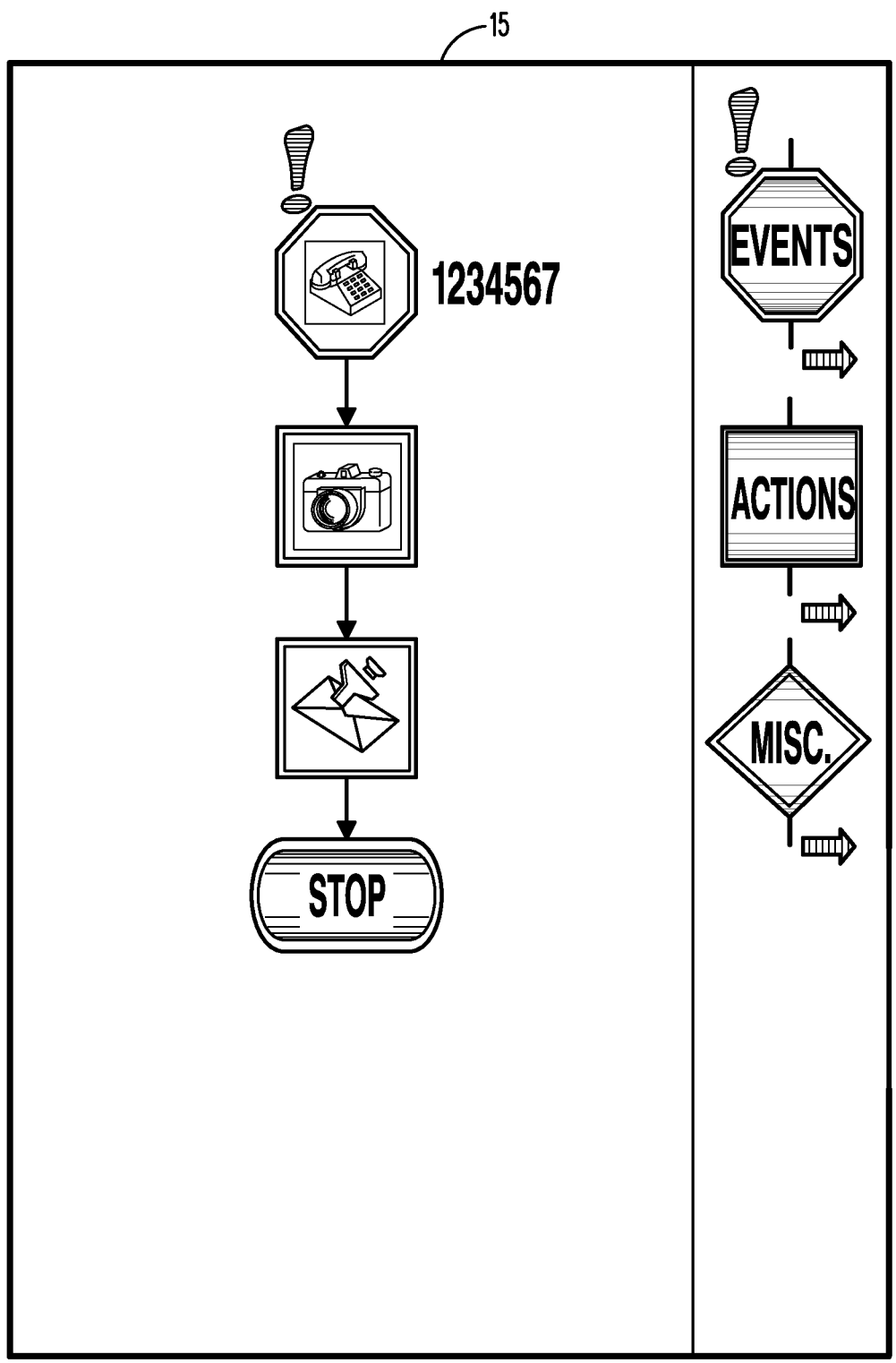

Having defined the relationship between the 'receipt of a telephone call event' icon with the 'taking of a photograph' icon, the user uses the user interface 16 to select a further function icon displayed in the right hand column of the display 15, namely the 'sending an MMS message' icon, which is illustrated in FIG. 3e. In a similar manner to that described above, the user then uses the user interface 16 to set the configuration parameters associated with the 'sending an MMS message' function and define the relationship between the 'taking of a photograph' icon and the 'sending an MMS message' icon, namely that the photograph taken during the 'taking of a photograph' function is attached to an MMS message and the MMS message is sent to a designated telephone number (e.g. to the telephone that has just placed the call to the radiotelephone, alternatively the photograph could be sent to another specified telephone number).

Although the above embodiment illustrates the creation of a scenario having two functions (i.e. taking a photograph and mailing the photograph), equally a scenario could have a single function triggered by an event or by any number of functions triggered by an event.

Having linked the respective event and function icons to determine the sequence of functions that the radiotelephone is to perform following the receipt of a telephone call from a specified telephone number, the user selects a 'Stop' icon to signal the end of the sequence, which forms the end of the scenario. Once the scenario has been finish the user operates the user interface 16 to save and store the sequence in memory 14. Optionally, the user can indicate that the created scenario is to be active with immediate effect or that the scenario can be saved for future use.

The scenarios controlling system 20 allows a user to programme a mobile device to perform a specific operation using icons that are easily interpreted, where the icons are used to illustrate the steps that a user wishes the mobile device to perform and the scenarios controlling system 22 is used to generate code that instructs the mobile device to execute the scenario, thereby avoiding the user needing specialized hardware or software, or access to proprietary information, such as authentication keys and/or codes or require skills in complex coding.

It will be apparent to those skilled in the art that the disclosed subject matter may be modified in numerous ways and may assume embodiments other than the preferred forms specifically set out as described above, for example instead of using key selection to define the sequence of events and mobile device functions the icons could be selected via verbal commands. Further, any graphical representation could be used to represent the icons, for example a diagram or a word. As such, a mobile device with a text editor could be used to create a sequence of events and functions using a word or series of words to form a block diagram to represent the events and functions.

The invention claimed is:

1. A mobile device comprising:
   a display;
   a user interface; and
   a processor coupled to the user interface and the display, the processor operable to control the display of a plurality of icons, wherein the icons include at least one event icon that defines a specific event and at least one function icon that defines a function of the mobile device, and the processor responsive to user manipulation of the user interface to create a sequence of icons that includes at least one selected event icon and at least one selected function icon, wherein the at least one selected event icon defines an event that causes a function associated with the at least one selected function icon to be performed, and the processor operable to control the storing of the created sequence of icons for automatic execution of the at least one selected function upon the occurrence of the at least one selected event.

2. A mobile device according to claim 1, wherein the icons include at least two function icons that each define a function of the mobile device and the means for manipulating the icons is arranged to allow a sequence of icons to be generated that includes at least two selected function icons, wherein the at least one selected event icon defines the event that causes at least two functions associated with the at least two selected functions to be performed in the defined sequence.

3. A mobile device according to claim 1, further comprising a transmitter coupled to the processor, the mobile device operable for transmitting created sequence to another device.

4. A mobile device according to claim 1, further comprising a receiver coupled to the processor, the mobile device operable for receiving sequence from another device.

5. A mobile device according to claim 1, wherein the processor is further operable for modifying a stored sequence responsive to manipulation of the user input.

6. A mobile device according to claim 1, wherein the processor is further operable for associating configuration parameters with at least one of the selected function or action icons.

7. A mobile device according to claim 1, wherein the processor is operable for generating the sequence of selected functions in response to user selected inter-connections between selected icons.

8. A mobile device according to claim 2, further comprising a transmitter coupled to the processor, the mobile device operable for transmitting created sequence to another device.

9. A mobile device according to claim 2, further comprising a receiver coupled to the processor, the mobile device operable for receiving sequence from another device.

10. A mobile device according to claim 2, wherein the processor is further operable for modifying a stored sequence responsive to manipulation of the user input.

11. A mobile device according to claim 2, wherein the processor is further operable for associating configuration parameters with at least one of the selected function or action icons.

12. A mobile device according to claim 2, wherein the processor is operable for generating the sequence of selected functions in response to user selected interconnections between selected icons.

13. A method of user programming of scenarios for a mobile device, the mobile device including a display and a user interface, the method comprising:
   displaying on the display at least one event icon that defines a specific event and at least one function icon that defines a function of the mobile device;
   responding to manipulation of the user interface to create a sequence of icons that includes at least one selected event icon and at least one selected function icon; and
   storing a programmed scenario including at least one event associated with the selected event icon and at least one function associated with the at least one function icon; and
   automatically executing by the mobile device the programmed scenario of the at least one function upon the occurrence of the at least one event.

14. The method according to claim 13, further including the step of displaying user manipulated interconnections selected by the user for the order of the sequence.

15. The method according to claim 13, further including the step of associating configuration parameters responsive to inputs from the user interface with at least one of the selected function or action icons.

* * * * *